(12) United States Patent
Naets et al.

(10) Patent No.: US 7,563,413 B2
(45) Date of Patent: Jul. 21, 2009

(54) COMPRESSOR FOR HIGH PRESSURE POLYMERIZATION

(75) Inventors: Jan J. Naets, Leuven (BE); Philip H. Cornelissen, Heverlee (BE); Christopher K. Morgan, St. Francisville, LA (US)

(73) Assignee: ExxonMobil Chemical Patents Inc., Houston, TX (US)

( * ) Notice: Subject to any disclaimer, the term of this patent is extended or adjusted under 35 U.S.C. 154(b) by 390 days.

(21) Appl. No.: 11/481,219

(22) Filed: Jul. 5, 2006

(65) Prior Publication Data

US 2007/0031301 A1 Feb. 8, 2007

Related U.S. Application Data

(60) Provisional application No. 60/706,130, filed on Aug. 5, 2005.

(51) Int. Cl.
*B01J 19/00* (2006.01)
*F16C 1/00* (2006.01)
*F16D 3/00* (2006.01)
*C08F 2/00* (2006.01)

(52) U.S. Cl. .......................... 422/131; 464/51; 464/98; 464/99; 464/147; 526/64; D15/9

(58) Field of Classification Search ................. 422/131; D15/9; 464/51, 98, 99, 147; 526/64
See application file for complete search history.

(56) References Cited

U.S. PATENT DOCUMENTS

| 3,023,202 | A | 2/1962 | Schappert |
| 3,124,942 | A | 3/1964 | Rothfuss et al. |
| 3,336,764 | A | 8/1967 | Chambers |
| 3,611,739 | A | 10/1971 | Bonem |
| 4,288,406 | A | 9/1981 | Sims, Jr. |
| 6,596,241 | B2 * | 7/2003 | Donck .......................... 422/132 |

* cited by examiner

*Primary Examiner*—Walter D Griffin
*Assistant Examiner*—Lessanework Seifu

(57) ABSTRACT

The invention provides a compressor for use as a secondary compressor for an ethylene polymerization tubular reactor comprising a motor and at least two compressor frames, at least one of the compressor frames being coupled to the motor by means of a contoured diaphragm flexible coupling.

19 Claims, 4 Drawing Sheets

COMPRESSOR FOR HIGH PRESSURE POLYMERIZATION

CROSS REFERENCE TO RELATED APPLICATIONS

This application claims the benefit of Provisional Application No. 60/706,130 filed Aug. 5, 2005, the disclosure of which is fully incorporated herein by reference.

FIELD OF THE INVENTION

The invention relates to a compressor for use in a polyethylene high pressure reactor system, to a production plant including the compressor and to a process of making polyethylene homopolymers and copolymers.

BACKGROUND OF THE INVENTION

High pressure reactors for the polymerization of ethylene typically operate at pressures in excess of 1500 bar, and sometimes as high as 3000 bar. Moreover, the economic success of the process depends on the plant having a long operating lifetime and on keeping downtime to a minimum. High pressure ethylene polymerization reactor systems typically employ both a primary compressor that compresses the ethylene feedstock up to a pressure of, for example, 300 bar and a secondary compressor that further compresses the ethylene from the outlet pressure of the primary compressor up to the reactor pressure. Such a secondary compressor is mechanically complex and is subject to enormous mechanical forces, but is nonetheless required to operate at a high throughput reliably and safely over a lifetime of several decades in order for the process to be economically viable. Accordingly, the successful design and operation of the secondary compressor is critical to the commercial viability of the polymerization process.

The economic viability of the production of polyethylene and polyethylene copolymers in high pressure reactors is also heavily dependent on the scale of the process, that is, the tonnage of product produced per year. However, the mechanical demands on the secondary compressor, particularly the loads applied through the drive train, increase as the required throughput increases. Therefore, there is a need for secondary compressors which can operate reliably and safely at high throughputs. Note that for the purposes of this application, we will refer to the compressor as the secondary compressor, however, an initial reciprocating pump (instead of a primary compressor) may be used to bring the ethylene to a pressure of, for example, 300 bar, or, alternatively, the compressor frame could be modified to allow a single compressor to compress the ethylene from 1 bar to the operating pressure.

Secondary compressors for use with high pressure polymerization reactors are typically two-stage reciprocating compressors having, say, six or eight cylinders arranged in a compressor frame and having a common crankshaft driven by an electric motor standing at one end of the compressor frame. It is usually necessary to mount the compressor on foundations specially adapted to minimize vibration. One approach to developing secondary compressors of higher throughput has been to increase the size of the cylinders. However, that approach suffers from the disadvantage of also increasing the loads applied to the components of the cylinders and frame running gear components, particularly the connecting rods, bearings and those components that resist the greater pressure end load resulting from larger plunger diameters. A second approach has been to increase the number of cylinders in the compressor frame. However, that approach requires an increase in the length of the crankshaft and an increase in the power transmitted through the crankshaft and those factors limit the number of cylinders that can be included in a compressor frame.

A third approach to increasing the compressor throughput has been to include a second compressor frame on the opposite side of the motor. However, due to the difficulty inherent in attempting to perfectly align the crankshafts of two separate compressor frames, it has proved necessary to couple at least one of the compressor frames to the motor via a flexible coupling to avoid unsustainable stresses on the crankshafts, motor, and associated components due to imperfect alignment. One known type of flexible coupling used with secondary compressors includes packs of thin disc membranes, through which the torque applied by the motor is transmitted to the crankshaft of the compressor frame, and which can flex as they rotate, thereby accommodating the strains resulting from a slight misalignment of the compressor frame crankshaft and the motor driveshaft. However that type of flexible coupling has been found, in use, to suffer from problems which can cause the membranes to break up and fail. Failure of a flexible coupling may be hazardous to people at the plant and may cause a sudden plant shut-down requiring a lengthy clean up and re-commissioning period. Furthermore, the magnitude of the torque that can be transmitted by this type of coupling is limited by the size of the thin disk membranes that can be manufactured. Accordingly, there remains a need for a secondary compressor that can operate at high gas throughput reliably over a long working lifetime.

SUMMARY OF THE INVENTION

The invention provides a compressor for use in an ethylene polymerization high pressure reactor system comprising a motor and at least two compressor frames, with at least one of the compressor frames being coupled to the motor by means of a contoured diaphragm flexible coupling.

The term 'contoured diaphragm flexible coupling' as used herein refers to a coupling which includes a diaphragm arranged in a plane generally perpendicular to the axis of rotation, through which the torque is transferred and which by flexing in use accommodates misalignment of the motor driveshaft and the compressor frame crankshaft. The inventors believe that the inherent simplicity of this coupling compared to the multi-membrane type allows for a more accurate prediction of torsional stiffness in the design, thereby helping to attain greater reliability of the coupling in use.

Shaft misalignment can be broken down into two components, parallel offset, where the axes of the shafts are parallel but do not lie on the same line, and angular misalignment, where the axes of the shafts do not lie on the same line but instead intersect at an angle. The shaft misalignment will usually comprise both an angular and a parallel offset component which can be accommodated by having two axially spaced-apart diaphragms operating on the common axis of rotation. Accordingly, the contoured diaphragm flexible coupling will preferably comprise two diaphragms having a common axis of rotation and each being fixed to an elongate rigid member extending between them.

Contoured diaphragm flexible couplings are known for use with gas turbines and centrifugal compressors. Such centrifugal compressors operate at relatively low, constant torque and at very high speeds of rotation. The present invention has found that contoured diaphragm flexible couplings also have application in compressors for high pressure polymerization reactor systems, even though those compressors operate at relatively low speed and at very high torque, which varies through the reciprocation cycle, and despite the other demands mentioned above made upon components in such compressors.

An embodiment is an arrangement having more than two compressor frames, for example, where two compressor frames are coupled to the motor and one or more further compressor frames are coupled via a flexible coupling to the crankshaft of one of those two compressor frames. Preferably, however, the compressor includes only two compressor frames arranged on opposite sides of the motor, one compressor frame being coupled to the motor via a rigid coupling and the other compressor frame being coupled to the motor via a contoured diaphragm flexible coupling. It is also possible to couple each of the two compressor frames to the motor via its own contoured diaphragm flexible coupling.

Each diaphragm of the flexible coupling is preferably a single plate and may be of any suitable shape, although a circular shape is preferred. The diaphragms are relatively thin and are required to flex to accommodate the shaft misalignment. Each diaphragm will typically be connected on one side to either the motor shaft or the compressor frame crankshaft by an adapter flange and, on its other side, to the rigid member and thereby to the other diaphragm. The motor shaft or crankshaft may be connected at the inner part of the diaphragm and the rigid member to the outer (i.e., farther from the axis of rotation) part of the diaphragm or vice versa. In either arrangement, torque is transmitted through the diaphragm between the outer regions and the inner regions. Misalignment of the motor shaft and frame crankshaft causes distortion of the diaphragm as it rotates in a complex way while in use. As mentioned above, the diaphragms may be of any size, shape and configuration that allows them to flex while transmitting the appropriate torque.

DETAILED DESCRIPTION OF THE INVENTION

The shafts and the rigid elongate member which extends between the diaphragms may be connected to the diaphragm in any manner which is suitable for the transmission of the required torque, for example, by means of bolts, splines, or welds. Preferably, however, the fastenings are releasable fastenings, such as bolts, thereby allowing the coupling to be replaced in whole or in part, if desired.

The rigid elongate member may also be of any suitable size, shape, and configuration and must be rigid enough to cope with the torque transmitted through it. In practice, the torsional stiffness is very much a part of the coupling design and is adjusted to a design target by changing the geometry of the rigid elongate member. It may, for example, be a solid cylinder or shaft. However, a tubular shape is preferred.

In one embodiment, the flexible coupling includes first and second diaphragms, each diaphragm having a hub adapted to receive fasteners and a rim adapted to receive fasteners, the flexible coupling further including a rigid tubular member fastened to and extending between the first and second diaphragms.

Figure 4:
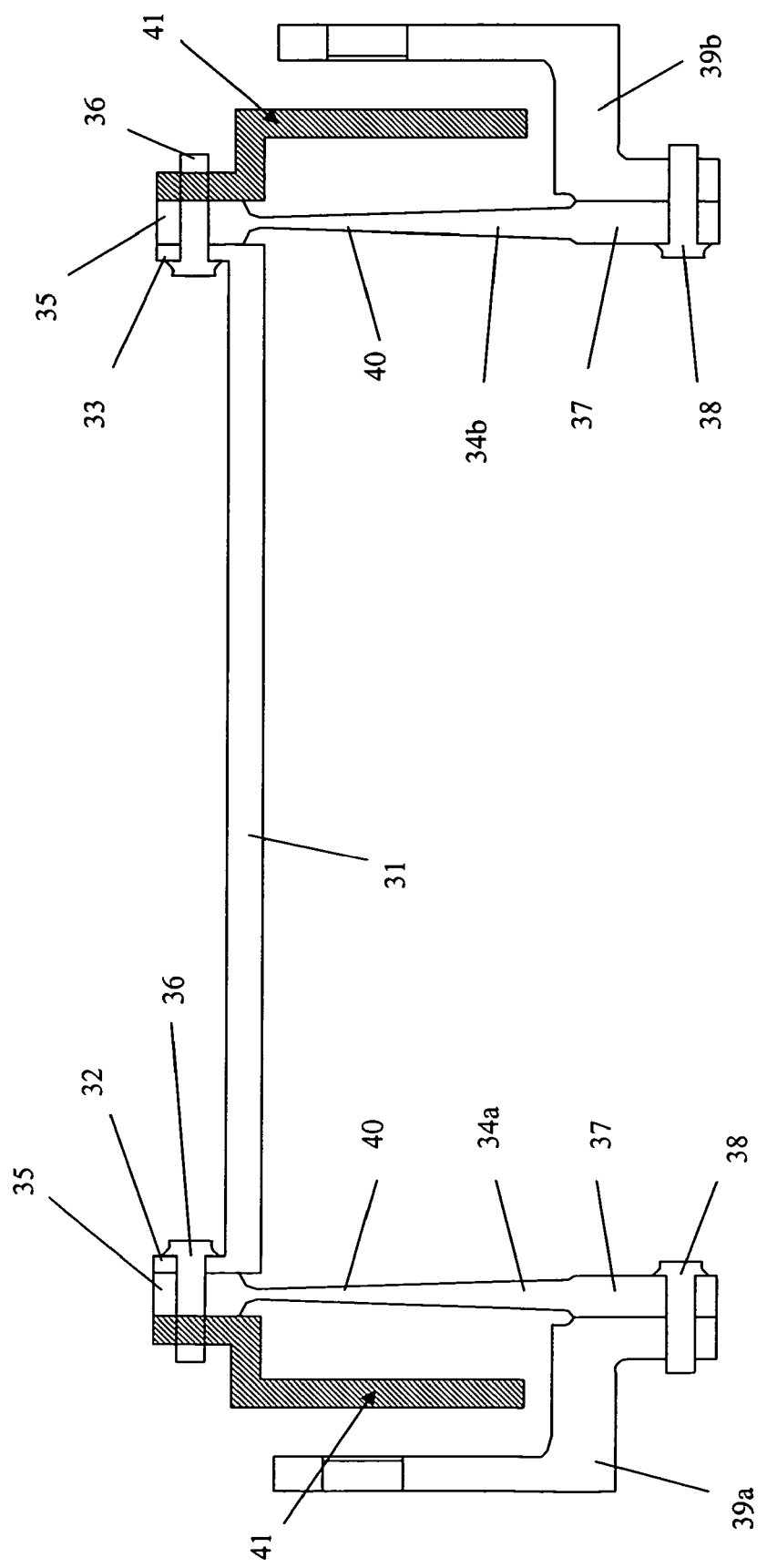
FIG. 4 shows a contoured diagram flexible coupling.

As mentioned above, either of the diaphragms of the rigid elongate member may be attached at the hub of the diaphragm, in which case the motor shaft or compressor frame crankshaft will be attached to the rim, or the rigid elongate member may be attached at the rim, in which case the shaft will be attached at the hub. In one embodiment, the rigid elongate member is fastened to the rim of the first and second diaphragms (as depicted in FIG. 4). In alternative embodiments, the rigid elongate member is fastened to the rim of one of the diaphragms and the hub of the other of the diaphragms. Additionally, the rigid elongate member may be fastened to the hub of both diaphragms.

The diaphragms may include flanges extending from one or both of the hub or rim for attachment to the shaft or rigid elongate member or adapter flange.

The size of the contoured diaphragm flexible coupling, especially the size of the diaphragms, will be related to the amount of power to be transmitted by the coupling.

The flexible coupling, optionally, includes on at least one of the two diaphragms a plurality of outer bolt holes which lie on an outer circle or multiple outer circles. The outer circle or circles each have a diameter in the range of from 800 mm to 2000 mm, preferably from 1000 mm to 1300 mm.

The flexible coupling may comprise at least one and preferably two diaphragms having a plurality of inner bolt holes arranged in an inner circle, or multiple inner circles. The inner circle or inner circles each have a diameter in the range of from 150 mm to 900 mm, preferably from 300 mm to 500 mm.

The diaphragms may include apertures or cutouts to decrease weight and increase flexibility. The diaphragms may have a wavy cross-section (in a plane which includes the axis of rotation), thereby giving a convoluted shape. Typically, the plate is of a circular shape and is free of apertures except for bolt holes and an optional central aperture inside the inner bolt holes.

Preferably, each diaphragm is machined from a solid disc of heat treated alloy. Preferably, each diaphragm is of a high strength steel alloy such as AMS 6414. Preferably, each diaphragm is finished to remove any surface cracks or other features which may act to focus stress and initiate cracks, for example, the diaphragms may be shot-peened. Advantageously, the flexible coupling may include guards to protect the diaphragms from scratches and also prevent a large displacement of the coupling components in the event of a coupling diaphragm failure.

The diaphragms are preferably contoured to achieve an adequate stress distribution during applied torque and misalignment distortion. The size and profile of the diaphragms are chosen based on the sometimes conflicting interests of required torque transmission, maximum design allowed misalignment, the fatigue strength of the material, and the practical geometric constraints of the connected machinery. In that way, the stress generated by the deformation of the diaphragms in use is kept below the maximum permissible stress for infinite fatigue life for a given torque rating and misalignment allowance. The design features of a diaphragm therefore represent a balance between its ability to transmit torque and its flexibility.

Preferably, the flexible coupling includes at least one and preferably two diaphragms each having a region of decreasing thickness in the radial direction outwards from the axis of rotation of the flexible coupling.

Preferably, each diaphragm includes a region which is tapered in a radial direction, being thicker toward the middle and thinner toward the rim, to achieve a more uniform torsional and axial bending stress distribution through the profile of the diaphragm in a radial direction. Preferably, this tapered portion of the diaphragm is joined to other portions, such as a hub and a rim portion, by means of smooth filleted junctions.

Preferably, the flexible coupling comprises two substantially identical diaphragms.

The geometry of the elongate member between the diaphragms should be chosen to achieve a designed torsional stiffness of the coupling to avoid excitation of the torsional natural frequency, or multiples of the torsional natural frequency, of the system of the motor coupling and compressor. The length, diameter, wall thickness, and material contribute to the torsional stiffness of the coupling and are chosen to fit within the geometrical constraints of the coupled machines. The distance between the diaphragms may be, for example, in the range of from 500 mm to 2500 mm, preferably in the range of from 800 mm to 1400 mm. The diameter of the elongate member may be, for example, in the range of 150 mm to 2000 mm, preferably in the range of 300 mm to 1300 mm. The wall thickness of the elongate member may be, for example, in the range of 10 mm to 300 mm, preferably in the range of 15 mm to 40 mm. The elongate member may be of any suitable material, for example, AMS 6415 steel.

Preferably, the flexible coupling is capable of accommodating an angular misalignment of the shafts up to one sixth of a degree, more preferably up to one third of a degree, even more preferably up to half a degree.

Preferably, the flexible coupling is capable of transmitting at least 600,000 Newton-meters of torque, more preferably at least 1,000,000 Newton-meters, advantageously at least 2,000,000 Newton-meters of torque from the motor to the compressor frame.

Advantageously the compressor is capable of a gas throughput of 100 tonnes or more per hour, preferably 120 tonnes or more per hour, more preferably at least 160 tonnes per hour, at a pressure of at least 1500 bar, preferably at least 2000 bar, more preferably at least 2500 bar. The compressor preferably comprises two compressor frames having a total of at least 10, preferably at least 12, more preferably at least 14, even more preferably at least 16, and most preferably at least 18 cylinders.

The invention also provides a high pressure production apparatus for ethylene homopolymers and copolymers comprising a tubular reactor and a compressor according to the invention. The invention alternatively provides a high pressure production apparatus for ethylene homopolymers and copolymers comprising an autoclave reactor and a compressor according to the invention.

The invention further provides a process of making ethylene homopolymers and copolymers comprising the step of compressing ethylene gas, optionally including one or more comonomers, to a pressure of at least 1500 bar, preferably at least 2000 bar, more preferably at least 2500 bar, still more preferably at least 2800 bar, using a compressor according to the invention. Advantageously, the compressor operates at a gas throughput of at least 100 tonnes per hour, preferably at least 120 tonnes per hour, and more preferably at least 160 tonnes per hour.

Figure 1:
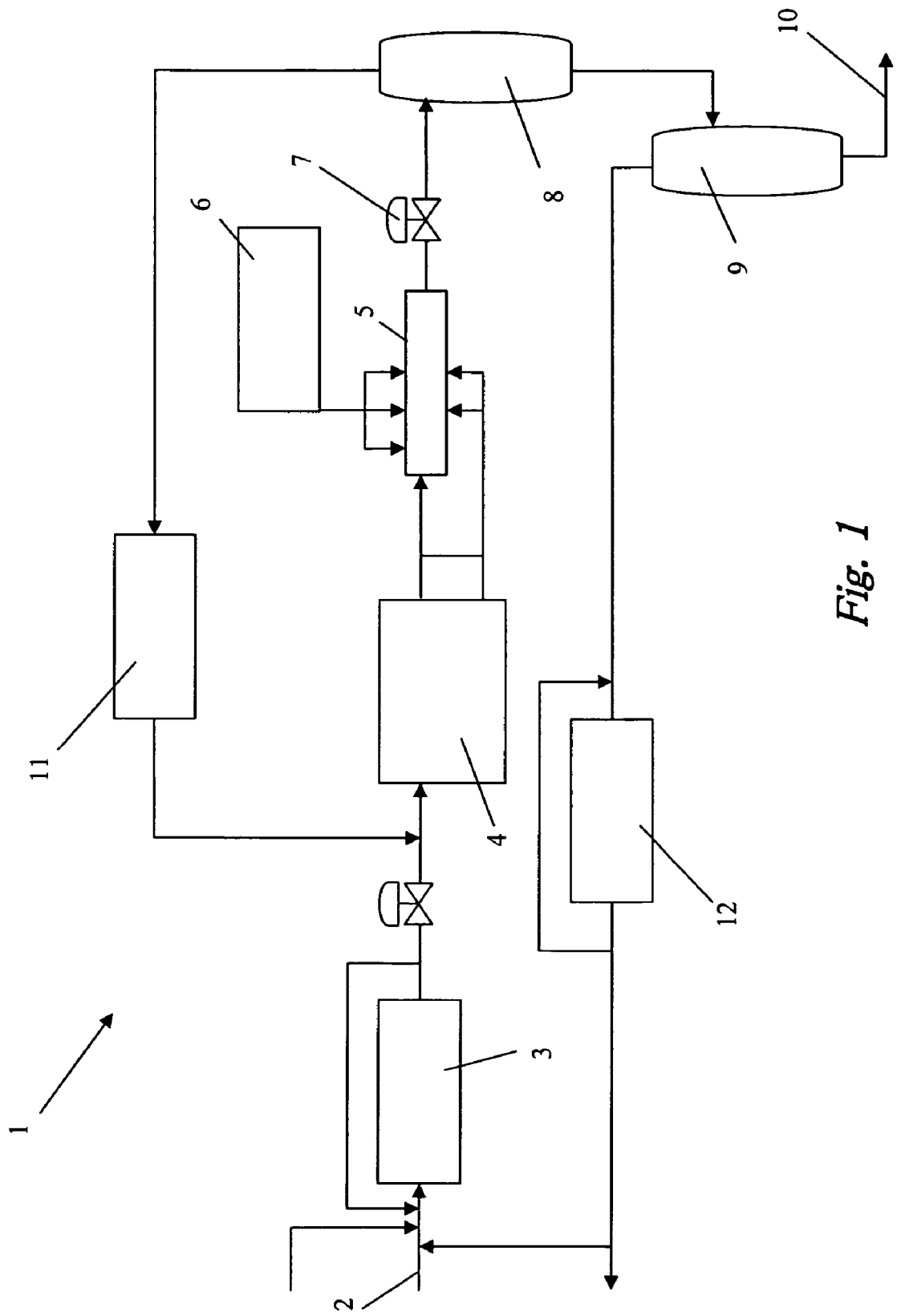
FIG. 1 is a simplified block diagram of a tubular reactor plant for the production of low density polyethylene and polyethylene copolymers.

FIG. 1 shows a polymerization plant 1 including an ethylene feed line 2 which supplies ethylene at a pressure of 70 bar to a primary compressor 3 which compresses the ethylene to a pressure of approximately 300 bar. The outlet of the primary compressor 3 communicates through a pipe having a valve with the inlet of secondary compressor 4 which is a two-stage reciprocating compressor and compresses the ethylene and other reaction components to a pressure of 3000 bar. The compressed ethylene leaving the secondary compressor 4 is split into two streams, one of which enters the front end of the tube reactor 5 and the other being split into one or more sidestreams which enter the tube reactor 5 at points along its length. The tube reactor is also provided along its length with several initiator injection points which are fed from the initiator injection system 6.

From the tube reactor 5 the mixture of polymer and unreacted monomer passes through high pressure let down valve 7 into high pressure separator 8 where it is separated into product polymer, which then passes to low pressure separator 9 and finally through pipe 10 to an extruder (not shown) and unreacted monomer, which passes back via the recycle gas system 11 to the inlet of the secondary compressor 4. Low pressure unreacted monomer gas passes from the low pressure separator 9 via a purge gas compressor 12 to the inlet of the primary compressor 3.

Figure 2:
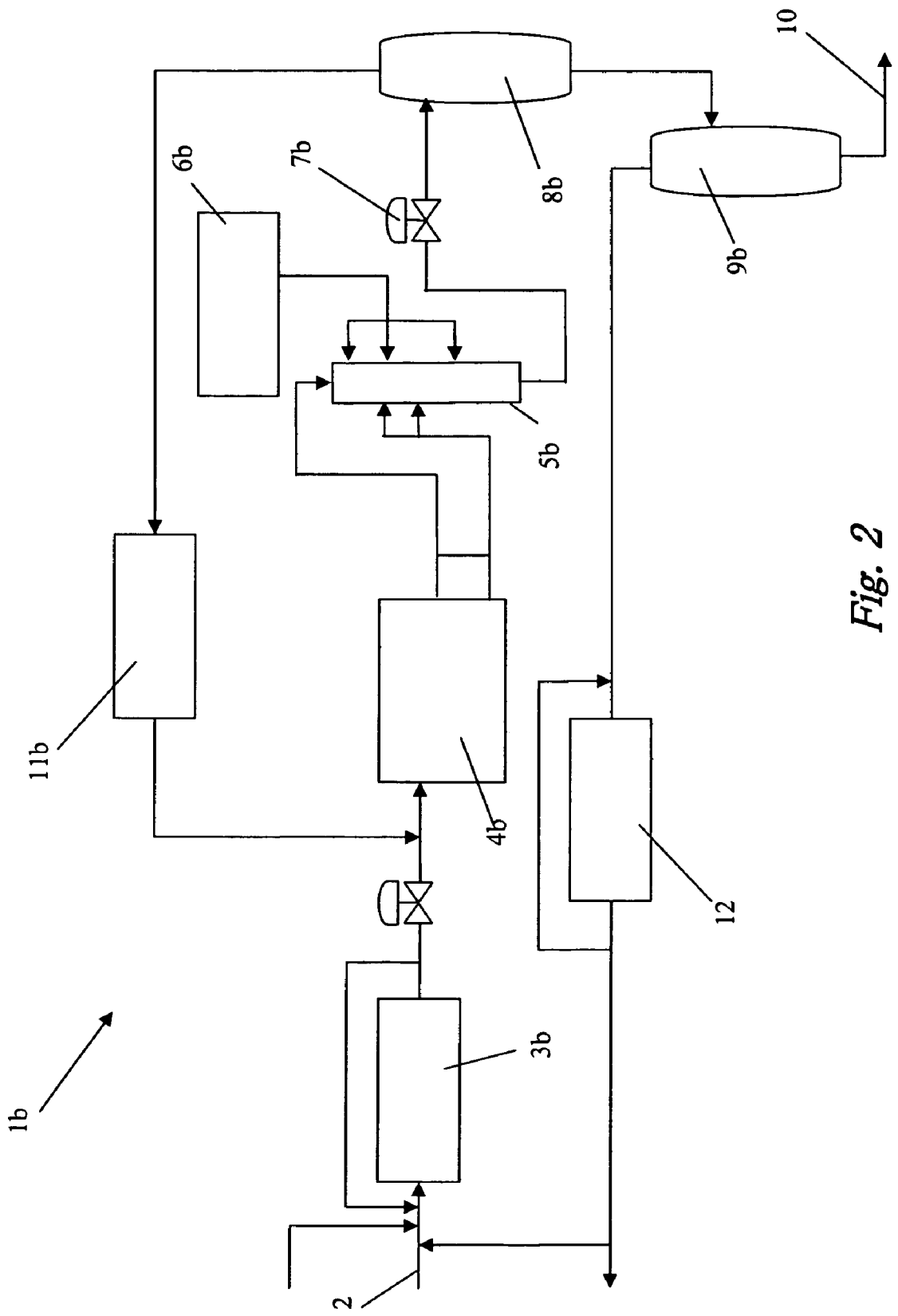
FIG. 2 is a simplified block diagram of an autoclave reactor plant for the production of low density polyethylene and polyethylene copolymers.

FIG. 2 shows a polymerization plant 1b including an ethylene feed line 2b which supplies ethylene at a pressure of 70 bar to a primary compressor 3b which compresses the ethylene to a pressure of approximately 300 bar. The outlet of the primary compressor 3b communicates through a pipe having a valve with the inlet of secondary compressor 4b which is a two-stage reciprocating compressor and compresses the ethylene and other reaction components to a pressure of 1500 bar. The compressed ethylene leaving the secondary compressor 4b is split into two streams, one of which enters the front end of the autoclave reactor 5b and the other being split into one or more sidestreams which enter the autoclave reactor 5b at points along its length. The autoclave reactor is also provided along its length with several initiator injection points which are fed from the initiator injection system 6b.

From the autoclave reactor 5b the mixture of polymer and unreacted monomer passes through high pressure let down valve 7b into high pressure separator 8b where it is separated into product polymer, which then passes to low pressure separator 9b and finally through pipe 10b to an extruder (not shown) and unreacted monomer, which passes back via the recycle gas system 11b to the inlet of the secondary compressor 4b. Low pressure unreacted monomer gas passes from the low pressure separator 9b via a purge gas compressor 12b to the inlet of the primary compressor 3b.

Figure 3:
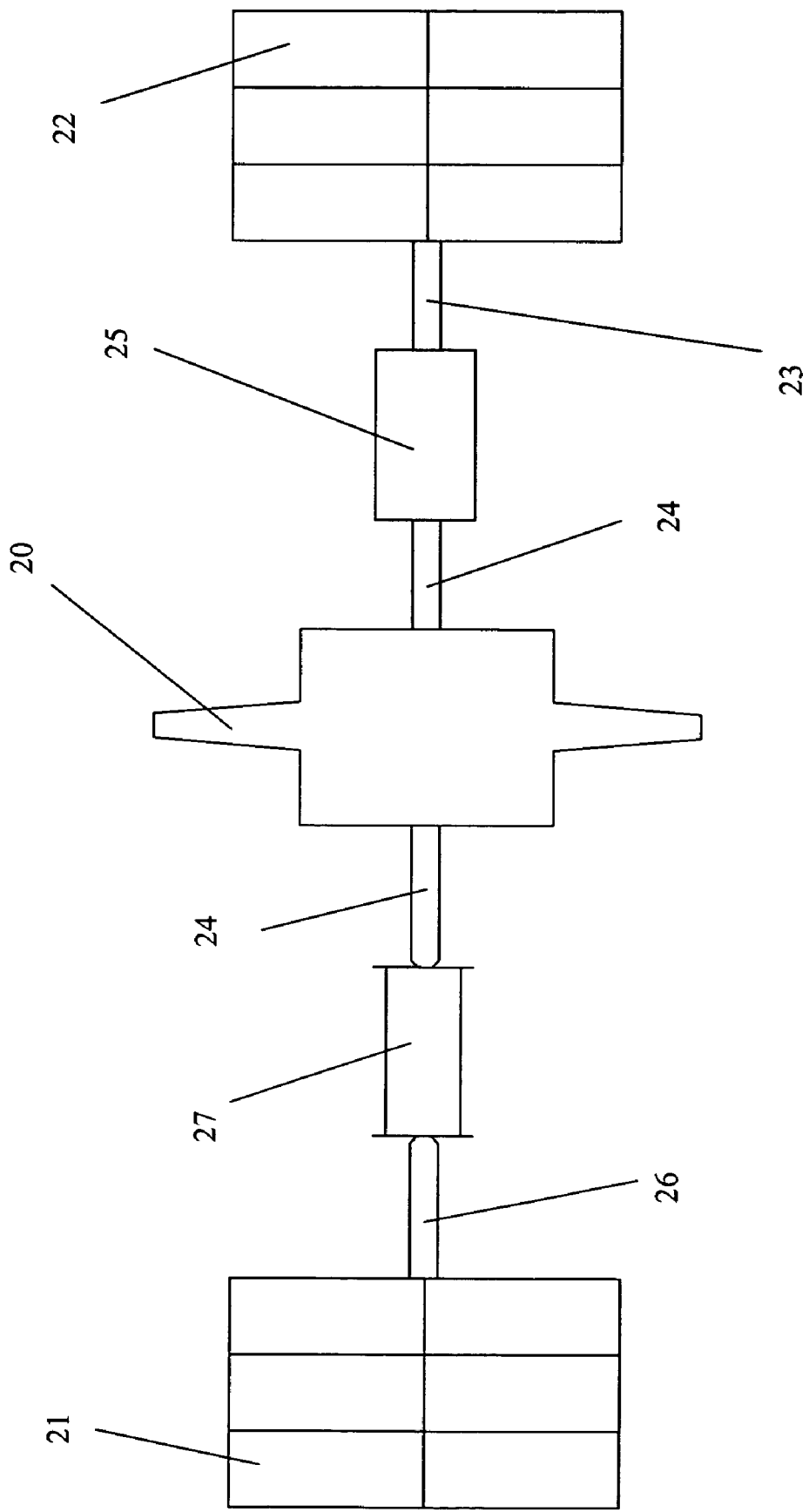
FIG. 3 shows a schematic of a compressor according to the invention.

FIG. 3 shows a schematic drawing of a compressor according to the invention comprising an electric motor 20 arranged between two identical compressor frames 21 and 22, each having six cylinders arranged in three opposing pairs. The crankshaft 23 of the compressor frame 22 to the right of the motor 20 is coupled to the driveshaft 24 of the motor via a rigid coupling 25. The crankshaft 26 of the compressor frame 21 to the left of the motor 20 is coupled to the motor driveshaft 24 via a contoured diaphragm flexible coupling 27 according to the invention.

FIG. 4 shows a section through half of a contoured diaphragm flexible coupling according to the invention. In FIG. 4 the axis of rotation of the coupling is marked by line 30. The coupling comprises a rigid tubular member 31 which has at each end an externally projecting flange 32, 33. The coupling comprises two identical contoured diaphragms 34a, 34b, each located at an end of tube 31 and each comprising an outer rim 35 which is fastened by bolts 36 to one of the flanges 32, 33. Each diaphragm 34a, 34b, has an inner hub 37 which is fastened by bolts 38 to a respective flange 39a, 39b. Flange 39a is fastened by bolts (not shown) to the driveshaft of the motor (not shown) and flange 39b is fastened by bolts (not shown) to the crankshaft of the compressor frame (not shown). Each diaphragm 34a, 34b includes a relatively thin region 40 which tapers, being thicker toward the hub 37 and thinner toward rim 35. In use of the coupling, the thin region 40 of each diaphragm 34a, 34b flexes to accommodate misalignment of the motor shaft and the compressor frame crankshaft.

The outer bolts 36 lie on a circle concentric with the axis of rotation 30 whilst the inner bolts 38 lie on a smaller circle that is also concentric with axis 30.

Each diaphragm 34a, 34b, is provided with a guard plate 41 which is fastened to the diaphragm by outer bolts 36.

Fine adjustments to the length of the coupling may be made by inserting shims between the tube flanges 32, 33 and the rims 35 of the diaphragms 34a, 34b.

Although preferred embodiments have been depicted and described in detail herein, it will be apparent to those skilled in the relevant art that various modifications, additions, substitutions, and the like can be made without departing from the spirit of the invention and these are, therefore, considered to be within the scope of the invention as defined in the claims which follow. To the extent that our description is specific, this is solely for the purpose of illustrating preferred embodiments of our invention and should not be taken as limiting our invention to these specific embodiments. The use of subheadings in the description is intended to assist and is not intended to limit the scope of our invention in any way.

What is claimed is:

1. A compressor for use in an ethylene polymerization high pressure reactor system comprising a motor and two compressor frames, the two compressor frames arranged on opposite sides of the motor, one compressor frame being coupled to the motor via a rigid coupling and the other compressor frame being coupled to the motor via a contoured diaphragm flexible coupling; and further wherein the flexible coupling includes first and second diaphragms, each diaphragm having a hub adapted to receive fasteners and a rim adapted to receive fasteners, the flexible coupling further including a rigid tubular member fastened to and extending between the first and second diaphragms; and wherein each diaphragm is provided with a guard plate.

2. The compressor as claimed in claim 1, in which the high pressure reactor system is a tubular reactor system.

3. The compressor as claimed in claim 1, in which the high pressure reactor system is an autoclave reactor system.

4. The compressor as claimed in claim 1 in which the rigid tubular member is fastened to the rim or hub of the first diaphragm.

5. The compressor as claimed in claim 1 in which the rigid tubular member is fastened to the rim or hub of the second diaphragm.

6. The compressor as claimed in claim 1 in which the flexible coupling includes at least one diaphragm having a plurality of outer bolt holes which lie on a circle or multiple circles having diameters in the range of from 800 mm to 2000 mm.

7. The compressor as claimed in claim 1 in which the flexible coupling comprises at least one diaphragm having a plurality of inner bolt holes arranged in a circle or multiple circles having diameters in the range of from 150 mm to 900 mm.

8. The compressor as claimed in claim 1 in which the flexible coupling includes at least one diaphragm having a region of decreasing thickness in the radial direction outwards from the axis of rotation of the flexible coupling.

9. The compressor as claimed in claim 8 in which the at least one diaphragm is tapered in a radial direction.

10. The compressor as claimed in claim 1 in which the flexible coupling comprises two diaphragms which are substantially identical to each other.

11. The compressor as claimed in claim 1 in which the flexible coupling comprises two diaphragms separated by a distance in the range of from 500 mm to 2500 mm.

12. The compressor as claimed in claim 1 in which the flexible coupling is capable of transmitting at least 600,000 Newton-meters of torque from the motor to the compressor frame.

13. The compressor as claimed in claim 1 capable of a throughput of at least 100 tonnes ethylene/hour at a pressure of at least 1500 bar.

14. The compressor as claimed in claim 1 in which the compressor comprises two compressor frames having a total of at least 12 cylinders.

15. A production plant for polyethylene homopolymers and polyethylene copolymers comprising a tubular reactor, and a compressor as claimed in claim 1.

16. A process of making polyethylene homopolymers and polyethylene copolymers comprising the step of compressing at least 100 tones/hour of ethylene gas, optionally, including one or more comonomers, to a pressure of at least 1500 bar using a compressor comprising a motor and two compressor frames, wherein the two compressor frames are arranged on opposite side of the motor, one compressor frame being coupled to the motor via a rigid coupling and the other compressor frame being coupled to the motor via a contoured diaphragm flexible coupling; wherein the flexible coupling includes first and second diaphragms, each diaphragm having a hub adapted to receive fasteners and a rim adapted to receive fasteners, the flexible coupling further including a rigid tubular member fastened to and extending between the first and second diaphragms.

17. The process of claim 16 in which the flexible coupling is capable of transmitting at least 600,000 Newton-meters of torque from the motor to the compressor frame.

18. The process of claim 16 wherein the compressor operates at a throughput of at least 160 tonnes/hour.

19. The process of claim 16 wherein the ethylene gas is compressed to a pressure of at least 2500 bar.

* * * * *